US012688863B2

(12) United States Patent
Biswas et al.

(10) Patent No.: US 12,688,863 B2
(45) Date of Patent: Jul. 21, 2026

(54) EMOTIONALLY-AWARE VOICE RESPONSE GENERATION METHOD AND APPARATUS

(71) Applicant: VERIZON PATENT AND LICENSING INC., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 17/539,405

(22) Filed: Dec. 1, 2021

(65) Prior Publication Data

US 2023/0169990 A1 Jun. 1, 2023

(51) Int. Cl.
| | |
|---|---|
| *G10L 25/63* | (2013.01) |
| *G10L 15/22* | (2006.01) |
| *G10L 15/26* | (2006.01) |
| *G10L 25/30* | (2013.01) |

(52) U.S. Cl.
CPC .............. *G10L 25/63* (2013.01); *G10L 15/22* (2013.01); *G10L 15/26* (2013.01); *G10L 25/30* (2013.01)

(58) Field of Classification Search
CPC ......... G10L 15/16; G10L 15/22; G10L 25/63; G10L 2015/227
See application file for complete search history.

(56) References Cited

U.S. PATENT DOCUMENTS

| | | | | |
|---|---|---|---|---|
| 7,251,606 | B2 * | 7/2007 | Horinaka | ................ G10L 17/26 |
| | | | | 704/E15.04 |
| 11,037,576 | B2 * | 6/2021 | Baughman | .......... G10L 15/1815 |
| 11,449,682 | B2 * | 9/2022 | Galitsky | .................. G06N 5/01 |
| 11,514,894 | B2 * | 11/2022 | Sejpal | .................... G10L 15/26 |
| 11,562,744 | B1 * | 1/2023 | Gao | ....................... G10L 13/033 |
| 11,580,350 | B2 * | 2/2023 | Wu | ..................... G06F 16/3329 |
| 11,580,955 | B1 * | 2/2023 | Meng | .................... G10L 13/047 |

(Continued)

OTHER PUBLICATIONS

Song, Zhenqiao, et al. "Generating responses with a specific emotion in dialog." Proceedings of the 57th Annual Meeting of the Association for Computational Linguistics. 2019 (Year: 2019).*

*Primary Examiner* — Andrew C Flanders
*Assistant Examiner* — Nandini Subramani

(57) ABSTRACT

Techniques for generating emotionally-aware audio, or voice, responses for a user interface of an application, such as an automated voice response application, are disclosed. In one embodiment, a method is disclosed comprising obtaining voice input from a user via an automated voice response user interface of an application, obtaining a textual representation of the voice input, using the textual representation of the voice input from a user to obtain a source emotion of the user, determining a response emotion using the source emotion, generating a response textual representation indicating textual content of the response, generating a frequency spectrum representation of the response in accordance with the response textual representation and the response emotion, using the frequency spectrum representation of the response to generate a voice response reflective of the textual content of the response and the response emotion, and communicating the response to the user via the user interface.

19 Claims, 9 Drawing Sheets

(56)                     References Cited

U.S. PATENT DOCUMENTS

| | | | | |
|---|---|---|---|---|
| 2015/0213800 A1* | 7/2015 | Krishnan | ............ | H04M 3/5232 |
| | | | | 704/246 |
| 2015/0348570 A1* | 12/2015 | Feast | ................. | G06Q 10/0639 |
| | | | | 704/270 |
| 2018/0005646 A1* | 1/2018 | Un | .................... | G06F 16/90332 |
| 2018/0090137 A1* | 3/2018 | Horling | .............. | G06F 16/9535 |
| 2019/0285673 A1* | 9/2019 | Skovenborg | ............ | G10L 25/18 |
| 2020/0372897 A1* | 11/2020 | Battenberg | .............. | G10L 13/10 |
| 2021/0151029 A1* | 5/2021 | Gururani | ................. | A63F 13/60 |
| 2023/0111824 A1* | 4/2023 | Mukherjee | .............. | G06N 3/08 |
| | | | | 704/200 |

* cited by examiner

200

| SOURCE EMOTION | RESPONSE EMOTION |
|:---:|:---:|
| HAPPY | HAPPY |
| SAD | COMPASSIONATE |
| SCARED | CALMING |
| FRUSTRATED | PACIFYING |

Figure 4:
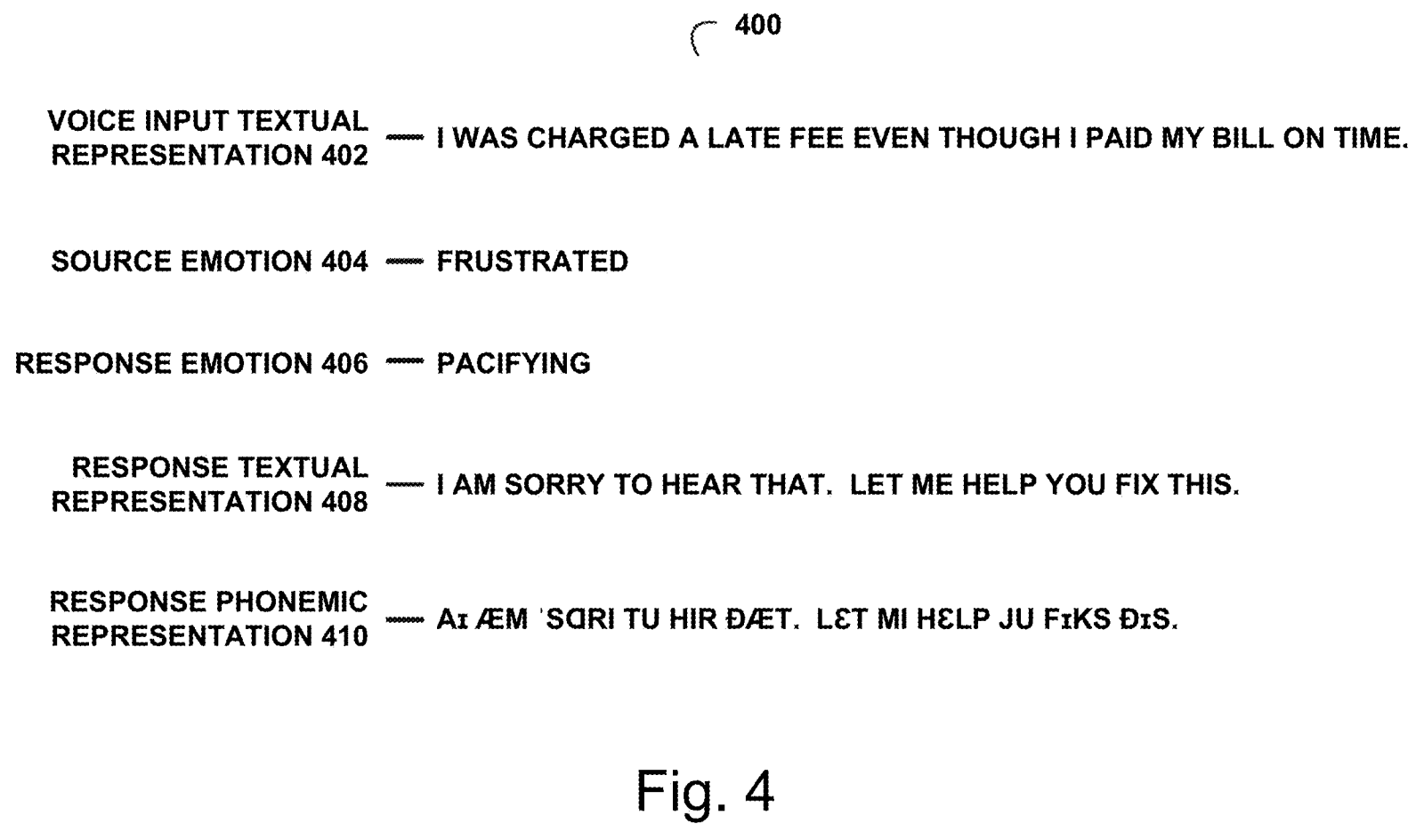

VOICE INPUT TEXTUAL REPRESENTATION 402 —— I WAS CHARGED A LATE FEE EVEN THOUGH I PAID MY BILL ON TIME.

SOURCE EMOTION 404 —— FRUSTRATED

RESPONSE EMOTION 406 —— PACIFYING

RESPONSE TEXTUAL REPRESENTATION 408 —— I AM SORRY TO HEAR THAT. LET ME HELP YOU FIX THIS.

RESPONSE PHONEMIC REPRESENTATION 410 —— Aɪ ÆM ˈSɑRI TU HIR ÐÆT. LɛT MI HɛLP JU FɪKS ÐɪS.

EMOTIONALLY-AWARE VOICE RESPONSE GENERATION METHOD AND APPARATUS

BACKGROUND INFORMATION

Automated voice response applications, such as voice bot applications, interactive voice response applications, or other dialog-based applications, can be used in place of a human being to interact with a user. Frequently, a user wishes to obtain some assistance from a customer service representative, technical support representative, or the like, but is instead directed to an automated voice response application. Unfortunately, many automated voice response applications are limited in their artificial intelligence abilities.

BRIEF DESCRIPTION OF THE DRAWINGS

FIG. 2 provides an example illustrating some mappings between source and response emotions for use in accordance with one or more embodiments of the present disclosure;

FIG. 4 provides an example illustrating aspects of a response generation in accordance with one or more embodiments of the present disclosure;

DETAILED DESCRIPTION OF EXAMPLE EMBODIMENTS

The disclosed embodiments can be used in dynamically formulating an emotionally-aware audio, or voice, response given audio, or voice, input from a user. Embodiments of the present disclosure can be used with an automated voice response system. By way of some non-limiting examples, the audio input can be from a call incoming to a call center, a voice application or service, voice command system, voice-based virtual assistant, etc. In accordance with one or more embodiments, the audio input can be converted to a textual representation (e.g., a transcript, or other textual representation) of the audio input. The textual representation of the voice input can be used to identify a source emotion. The identified source emotion can be used to determine a response emotion. Content of a response to the voice input can be determined. The response emotion and response content can then be used to generate the emotionally-aware audio, or voice, response, reflective of both the response content and response emotion. By way of some non-limiting example, the audio input and output can comprise spoken words.

Figure 1:
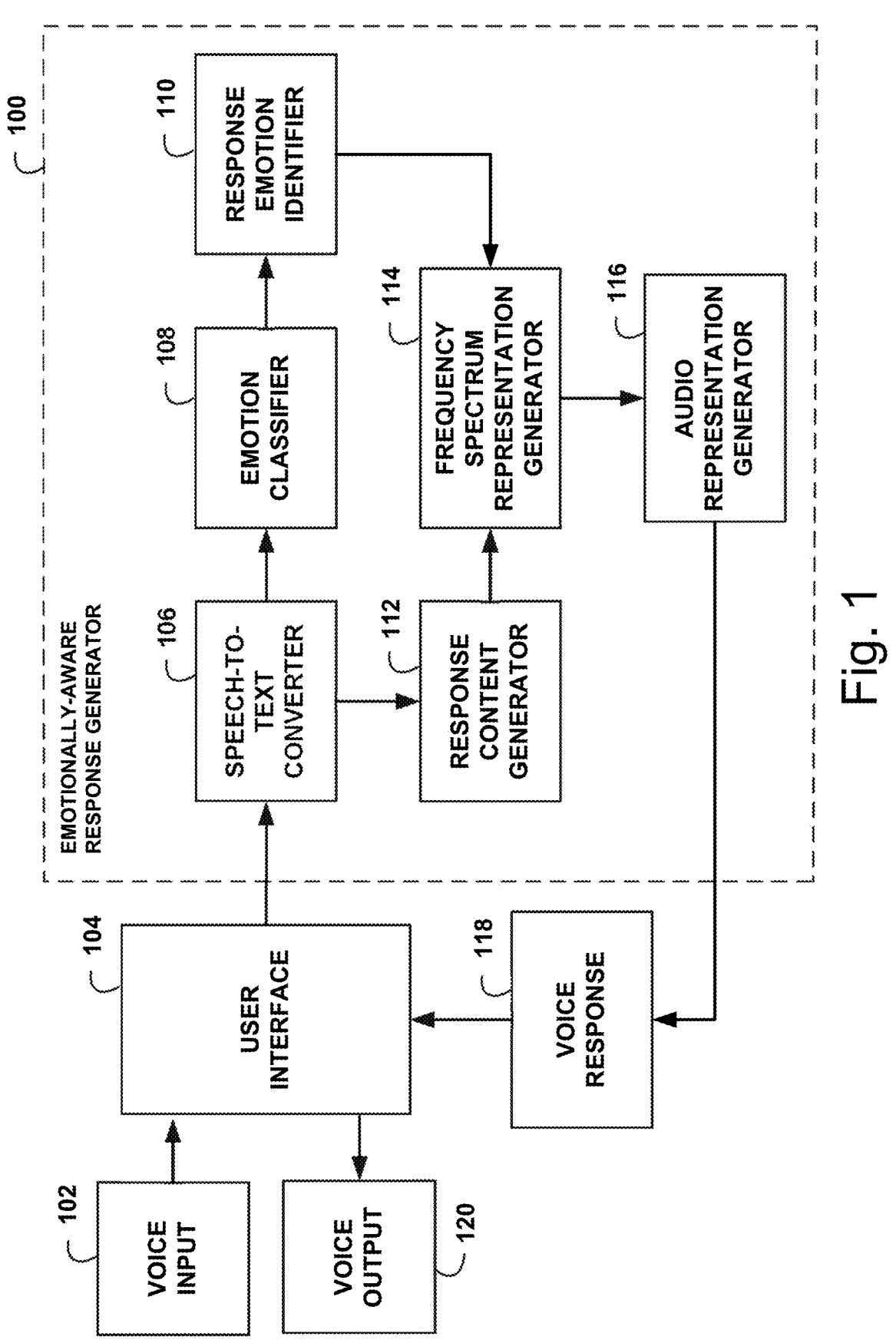
FIG. 1 provides an example illustrating emotionally-aware voice response generation in accordance with one or more embodiments of the present disclosure.

FIG. 1 provides an example illustrating emotionally-aware voice response generation in accordance with one or more embodiments of the present disclosure. Voice input 102 is received by user interface 104. By way of a non-limiting example, user interface 104 can be a component of an automated voice response system. User interface 104 can forward the voice input 102 to emotionally-aware voice response generator 100 (or voice response generator 100), which is configured to generate voice response 118. In accordance with one or more embodiments, voice response 118 comprises a response that is reflective of the textual content of the response and a response (or target) emotion. As is discussed in more detail below, the response emotion is selected using a source emotion identified using a textual representation of the voice input 102.

In accordance with at least one embodiment, voice response generator 100 comprises speech-to-text converter 106, emotion classifier 108, response emotion identifier 110, response content generator 112, frequency spectrum representation generator 114 and audio representation generator 116.

Speech-to-text converter 106 can be configured to convert voice input 102 to a textual representation of the content of the voice input 102. Speech-to-text converter 106 can be a tool provided by Google Cloud, speechtexter.com, Microsoft Azure, or the like. The textual representation of voice input 102 generated by speech-to-text converter 106 can be used by a number of components of voice response generator 100, as is discussed in more detail below.

In accordance with one or more embodiments, the textual representation of voice input 102 can be used by emotion classifier 108 to identify a source emotion corresponding to the voice input 102. Emotion classifier 108 can be trained using a machine learning algorithm and a number of training samples. Each training example can comprise a textual representation of an audio sample and an emotion designation as a label. By way of one non-limiting example, audio samples can comprise voice input 102 previously received via user interface 104. The textual representation of voice input 102 generated by speech-to-text converter 106 can be used as input to a trained emotion classifier 108 to obtain a source emotion for the voice input 102.

In accordance one or more embodiments, the source emotion identified by emotion classifier 108 can be used by response emotion identifier 110 to identify a response (or target) emotion for an audio response (e.g., voice response 118). In accordance with one or more embodiments, response emotion identifier 110 can use a mapping that maps a source emotion to a response emotion. A rule-based approach can be used to provide the mappings between source and response emotions.

FIG. 2 provides an example illustrating some mappings between source and response emotions for use in accordance with one or more embodiments of the present disclosure. Example 200 of FIG. 2 includes columns 202 and 204. Column 202 provides some examples of source emotions—happy, sad, scared, frustrated—that can be identified for voice input 102. Column 204 provides some examples of response emotions—happy, compassionate, calming, pacifying. Each row can represent a mapping between a source emotion and a response emotion. By way of further illustration, assuming that the voice input 102 conveyed a frustrated emotion on the part of the user (as identified by emotion classifier 108 using the textual representation of voice input 102), response emotion identifier 110 can use the mapping represented in row 212 to identify a pacifying emotion. As is discussed in more detail below, the response emotion identified by response emotion identifier 110 can be used to generate voice response 118 reflective of both the textual content of the response and the identified response emotion.

Figure 3:
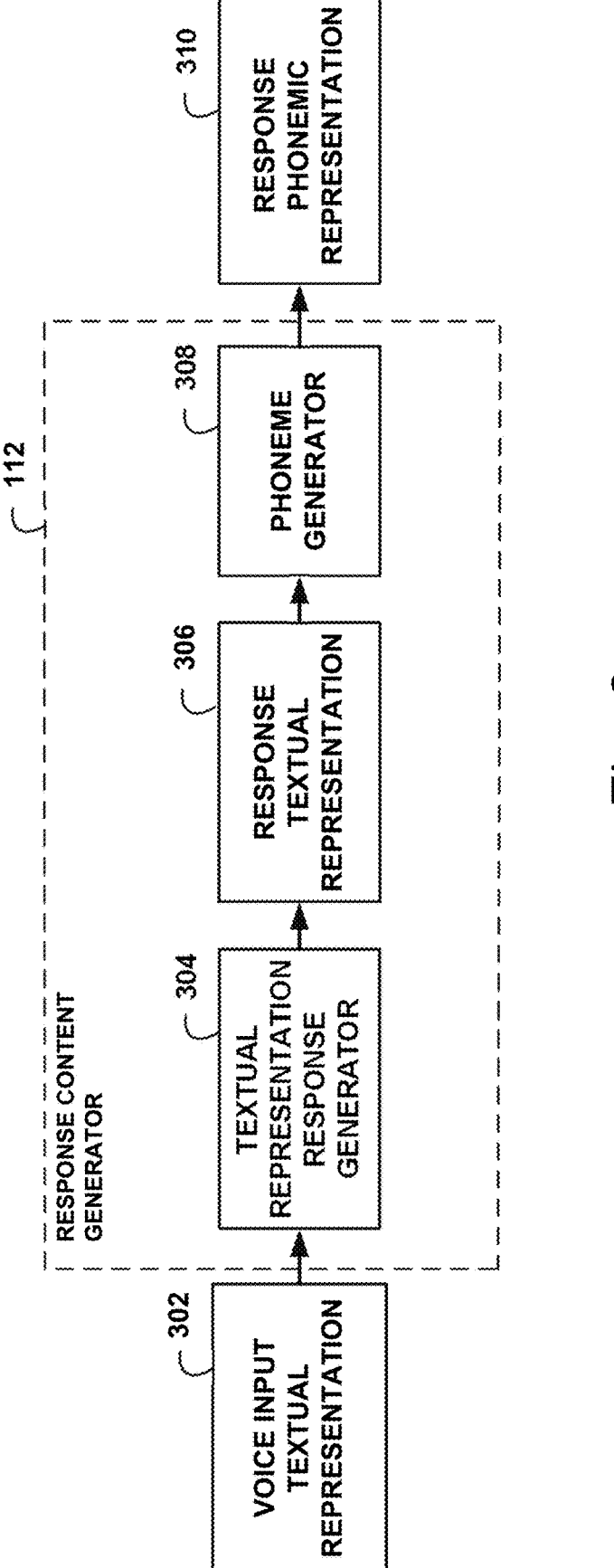
FIG. 3 provides an example of a response generator for use in accordance with one or more embodiments of the present disclosure.

Referring again to FIG. 1, in accordance with one or more embodiments, the textual representation of voice input 102 can be used by response content generator 100 to generate a textual representation of the response, from which a response phonemic representation can be generated. FIG. 3 provides an example of a response generator for use in accordance with one or more embodiments of the present disclosure. In accordance with one or more embodiments, response content generator 100 can comprise a textual representation response generator 304 and a phoneme generator 308.

In example 300 of FIG. 3, voice input textual representation 302 (e.g., textual representation of voice input 102) can be generated by speech-to-text converter 106 using voice input 102. Voice input textual representation 302 can be input to response content generator 100 to generate response textual representation 306, which comprises a textual representation of the content of a response to voice input 102. Although not shown in FIG. 3, response content generator 100 can use the response emotion determined by response emotion identifier 110 in generating the response textual representation 306. Response content generator 112 can use the input(s) (e.g., voice input textual representation 302 alone or in combination with the response emotion) to generate a textual representation of the response given the input(s) to response content generator 100.

In accordance with one or more embodiments, textual representation response generator 304 can be a statistical model trained using a machine learning algorithm and training samples. By way of a non-limiting example, textual representation response generator 304 can be trained using transcripts of conversations (e.g., calls, chats, discussions, etc.). Each training example can comprise a textual representation of a first communication and a second communications. The textual representation of the second communication can be used a label indicating a reply to the first communication.

The trained textual representation response generator 304 can be used to generate the response textual representation 306, which can be input to phoneme generator 308. The phoneme generator 308 can use response textual representation 306 to generate a response phonemic representation 310. In accordance with one or more embodiments, response phonemic representation 310 comprises a number of phonemes corresponding to the response textual representation 306. A phoneme refers to a phonetic unit of sound in a language. The response phonemic representation 310 can be a phonetic transcription (or textual representation) of the speech sounds (or phones represented as symbols) of the response textual representation 306. By way of a non-limiting example, the symbols can be symbols used in a phonetic alphabet, such as the International Phonetic Alphabet (IPA).

In accordance with one or more embodiments, a phonemizer can be used by phoneme generator 308 to generate the response phonemic representation 310 using the response textual representation 306 generated by textual representation response generator 304. By way of some non-limiting examples, a phonemizer can be a language transcription tool such as Epitran® provided by the Python® Software Foundation, Phonemizer® available at GitHub®, the online converter available at toPhonetics®, or the like.

FIG. 4 provides an example illustrating aspects of a response generation in accordance with one or more embodiments of the present disclosure. Example 400 shown in FIG. 4 includes a voice input textual representation 402, which can be generated by speech-to-text converter 106 using voice input 102. Voice input textual representation 402 can be used by emotion classifier 108 to identify source emotion 404. Source emotion 404 can be used by response emotion identifier 110 to determine response emotion 406. As discussed herein, response emotion identifier 110 can use a source-to-response emotion mapping to determine the response emotion 406 given source emotion 404. With reference to example 200 of FIG. 2, assuming for the sake of example that the source emotion is identified to be a frustrated source emotion, the mapping example shown in row 212 that maps a frustrated source emotion 404 to a pacifying response emotion 406 can be used to determine the response emotion 406.

Referring again to FIG. 4, in accordance with one or more embodiments, response textual representation 408 can be generated by textual representation response generator 304 using voice input textual representation 402 alone or in combination with response emotion 406. Response textual representation 408 can be used by phoneme generator 308 to generate response phonemic representation 410.

With reference to FIG. 1, the output of response content generator 100 (e.g., response phonemic representation 310, 410) can be input to frequency spectrum representation generator 114. In accordance with one or more embodiments, the response emotion (e.g., response emotion 406) determined by response emotion identifier 110 can also be input to frequency spectrum representation generator 114. Frequency spectrum representation generator 114 can use the input (e.g., response phonemic representation 310, 410 alone or in combination with response emotion 406) that it receives to generate a frequency spectrum representation of the response.

Figure 5:
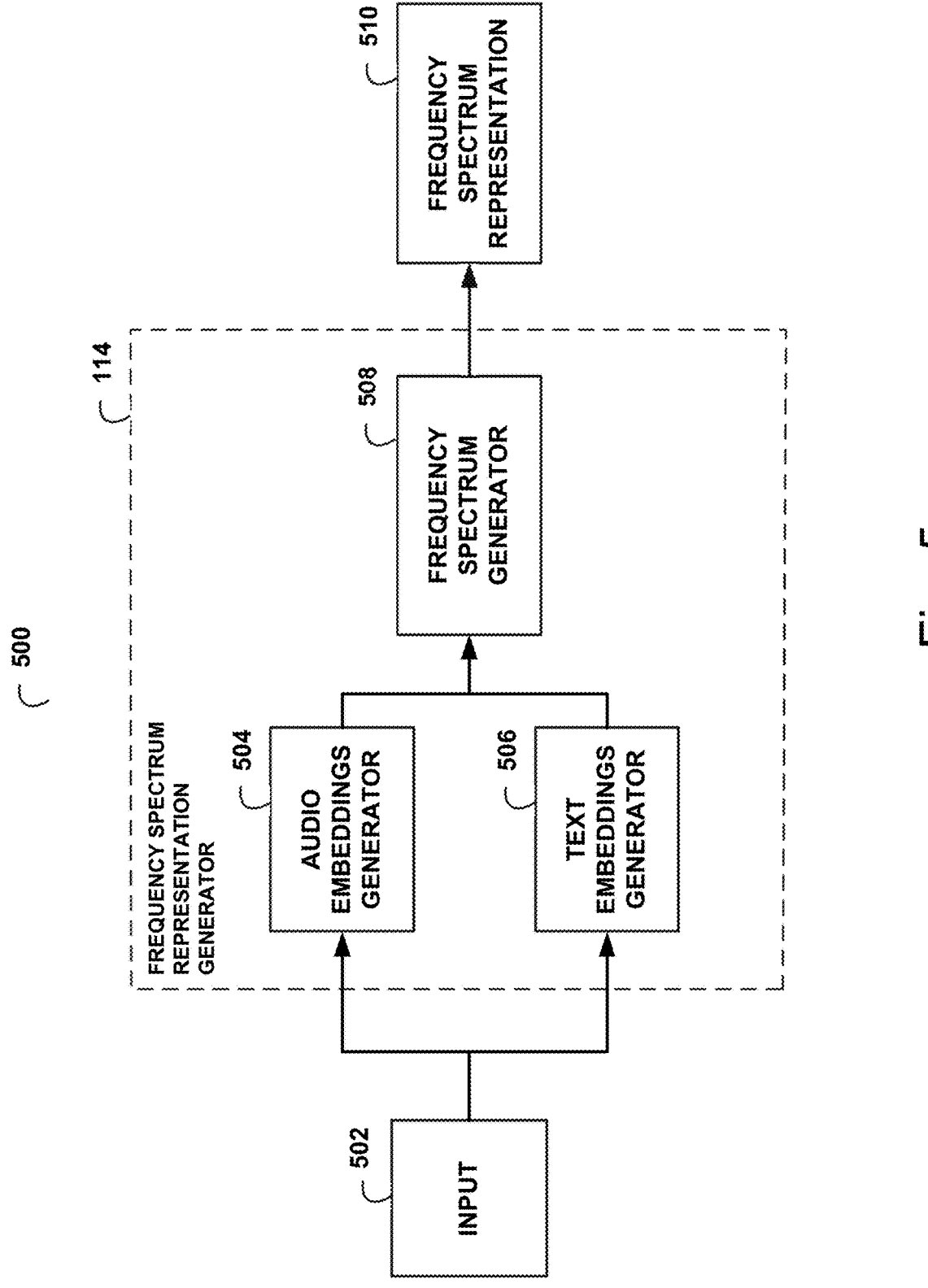
FIG. 5 provides an example illustrating components of frequency spectrum representation generator in accordance with one or more embodiments of the present disclosure.

FIG. 5 provides an example illustrating components of frequency spectrum representation generator 114 in accordance with one or more embodiments of the present disclosure. In example 500 shown in FIG. 5, frequency spectrum representation generator 114 comprises an audio embeddings generator 504, a text embeddings generator 506 and a frequency spectrum generator 508. Frequency spectrum representation generator 114 uses input 502 to generate frequency spectrum representation 510.

In accordance with one or more embodiments, audio embeddings generator 504 and text embeddings generator 506 can each comprise one or more neural networks. By way of a non-limiting example, audio embeddings generator 504 can be a stacked Long-Short Term Memory (LTSM) recurrent neural network (RNN) comprising one or more LSTM inner layers and at least one embedding layer configured to generate a set of audio embeddings. By way of a further non-limiting example, the text embeddings generator 506 can be an attention-based neural network (ANN) comprising at least one embedding layer configured to generate a set of text embeddings.

In accordance with one or more embodiments, audio embeddings generator 504 can be used to provide a set of audio embeddings comprising one or more audio embeddings. By way of a non-limiting example, each audio embedding can correspond to a phoneme in the response phonemic representation (e.g., response phonemic representation 310, 410). An audio embedding can be an encoding (e.g., vectorization, or vector) representing a portion of text (e.g., a phoneme, word, or the like). An audio embedding can reflect the vocalization (or other audio representation) of a phoneme, word, etc. In accordance with one or more embodiments, the set of audio embeddings can be generated by one or more inner layers of a neural network (e.g., Stacked-LSTM) component of audio embeddings generator 504. In accordance with one or more embodiments, the one or more audio embeddings of the set represent the vocalization (or other audio representation) of the response phonemic representation 310, 410.

In accordance with one or more embodiments, text embeddings generator 506 can be used to provide a set of text embeddings comprising one or more text embeddings. By way of a non-limiting example, each text embedding can correspond to a phoneme in the response phonemic representation (e.g., response phonemic representation 310, 410). A text embedding can be an encoding (e.g., vectorization, or vector) representing a portion of text (e.g., a phoneme, word, or the like). A text embedding can reflect the meaning of a phoneme, word, etc. In accordance with one or more embodiments, the set of text embeddings can be generated by one or more inner layers of a neural network (e.g., ANN) component of text embeddings generator 506. In accordance with one or more embodiments, the one or more text embeddings represent the meaning of the response phonemic representation 310, 410.

In accordance with one or more embodiments, an audio-embeddings neural network (e.g., a stacked LSTM) can be trained using a number of training samples comprising a number of audio samples (e.g., a number of sentences spoken with different emotions). Each audio sample can have a label indicating a corresponding emotion.

By way of a non-limiting example, the response phonemic representation 310, 410 and response emotion 406 can be input to a trained audio-embeddings neural network, which can generate, via one or more inner layers of the neural network, the corresponding set of audio embeddings, which can represent voice sounds in connection with the response phonemic representation 310, 410 and response emotion 406.

In accordance with one or more embodiments, a text-embeddings neural network (e.g., an ANN) component of text embeddings generator 506 can be trained using a number of textual samples (e.g., a number of textual representations of sentences). Each training sample can have a label indicating a corresponding emotion.

In accordance with one or more embodiments, the sets of audio and text embeddings generated by audio embeddings generator 504 and text embeddings generator 506 (respectively) can become input to frequency spectrum generator 508. The frequency spectrum generator 508 can comprise one or more neural networks. By way of a non-limiting example, frequency spectrum generator 508 can comprise a Stacked CNN-LSTM, or a Convolutional Neural Network (CNN) together with an LSTM.

The one or more neural networks of the frequency spectrum generator 508 can be trained to generate a frequency spectrum representation 510 of the voice response 118 using the sets of audio and text embeddings generated by audio embeddings generator 504 and text embeddings generator 506 (respectively). By way of a non-limiting example, the frequency spectrum representation 510 of voice response 118 can comprise a visual representation of the signal strength of voice response 118 over time at a number of frequencies. By way of one non-limiting example, the frequency spectrum representation 510 can be a MEL spectrogram. In accordance with one or more embodiments, frequency spectrum representation 510 can be generated by the one or more neural networks of the frequency spectrum generator 508 using the sets of audio and text embeddings. The frequency spectrum representation 510 of the voice response 118 (e.g., a MEL spectrogram) can represent, or reflect, the content of voice response 118 (e.g., both the textual content of the response and the response emotion) in a frequency, audio domain.

In accordance with one or more embodiments, the frequency spectrum representation 510 can be input to audio representation generator 116. Audio representation generator 116 can use the frequency spectrum representation 510 (e.g., a MEL spectrogram) to generate voice response 118. By way of a non-limiting example, audio representation generator 116 can comprise a waveform generator such as a Griffin-Lim function that converts a spectrogram (e.g., a MEL Spectrogram) to a waveform representation. By way of one non-limiting example, librosa.org provides a function, which can be used to perform the conversion. Documentation of the function can be found at librosa.feature.inverse-.mel_to_audio.

With reference to FIGS. 1 and 5, audio representation generator 116 can comprise a waveform generator which can be configured to convert a digital representation of the voice response 118, such as frequency spectrum representation 510 (e.g., a MEL spectrogram), to the voice response 118. In accordance with one or more embodiments, voice response 118 can be an analog representation of both the textual content of the response and the response emotion.

In accordance with one or more embodiments, the frequency spectrum representation 510 can be a digital representation of voice response 118 which is converted to the voice response 118 (an analog representation) using a waveform generator. As with the digital representation, the voice response 118 can reflect both the textual content of the response (e.g., such as that shown in the response textual representation 408) and response emotion (e.g., such as that shown in response emotion 406). By way of a non-limiting example, the response emotion can be conveyed using a corresponding tone, voice, or the like. By way of a further non-limiting example, using a pacifying response emotion as an example, voice response 118 can comprise the textual content shown in response textual representation 408 spoken using a pacifying tone, or voice.

Voice response 118 can be output as voice output 120 via user interface 104. By way of some non-limiting examples, the voice input 102 can be received and voice output 120 can be provided via a user device, such as and without limitation a smartphone, tablet, laptop, desktop, smart TV, virtual assistant, device, user computing device, a telephone (landline or cellular), or the like.

In accordance with one or more embodiments, user interface 104 can receive a subsequent voice input 102 after a voice output 120 is communicated to the user. Emotionally-aware voice response generator 100 can determine a source emotion for the second voice input 102. The source emotion determined for the second voice input 102 can be used as feedback for tuning or training components of the emotionally-aware voice response generator 100, such as and without limitation, response emotion identifier 110 and response content generator 100.

By way of a non-limiting example, with reference to FIG. 2, the source emotions shown in rows 208, 210 and 212 can be considered to be undesirable emotions, while the source emotion shown in row 206 can be considered a desirable emotion.

In accordance with one or more embodiments, components of the emotionally-aware voice response generator 100 can be trained to generate a voice response 118 that is likely to result in a desirable source emotion. Where the source emotion is an undesirable one, components of the emotionally-aware voice response generator 100 can be trained to generate a voice response 118 that is likely to cause a change in emotion of the user to a more desirable emotion. Where the source emotion is a desirable one, the emotionally-aware voice response generator 100 can be trained to generate a voice response 118 that is likely to maintain the desirable emotion, or cause a change to another desirable emotion.

An undesirable source emotion determined for the subsequent voice input 102 can be used as feedback to train components of the emotionally-aware voice response generator 100 to generate emotionally-aware voice responses 118 that are more likely to illicit desirable user emotions. In accordance with one or more embodiments, the training samples used to train components of the emotionally-aware voice response generator 100 can include information as a measure of the effectiveness of an emotionally-aware voice response 118 at achieving a desirable emotion. The measurement can be an indication of whether a source emotion of a subsequent voice input 102 was a desirable source emotion.

Figure 6:
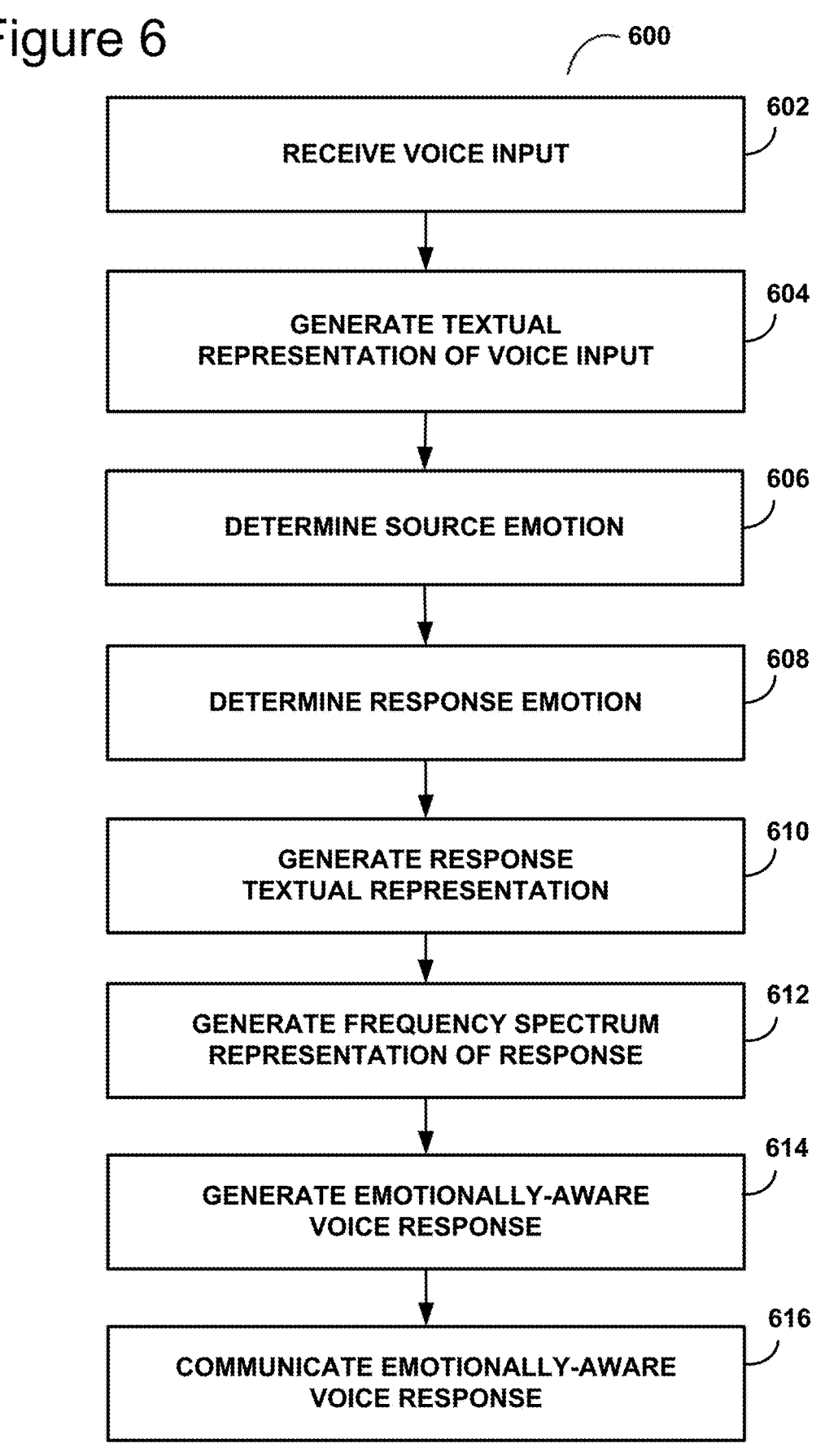
FIG. 6 provides an example of an emotionally-aware response generation process flow used in accordance with one or more embodiments of the present disclosure.

FIG. 6 provides an example of an emotionally-aware voice response generation process flow used in accordance with one or more embodiments of the present disclosure. The emotionally-aware voice response generation process flow 600 can be performed by emotionally-aware voice response generator 100 in response to voice input 102 from a user via user interface 104.

Process flow 600 can be invoked in response to voice input 102 provided via a user interface 104 of a software application, such as an automated voice response application. Some non-limiting examples of automated voice response applications include voice bot applications, interactive voice response applications, or other dialog-based applications.

In accordance with one or more embodiments, the emotionally-aware voice response generator 100 can be used to generate voice response 118 in response to voice input 102 of a user in any of a number of use cases, such as and without limitation customer service, information gathering, intelligent virtual assistant or the like.

At step 602 of process 600, voice input is received. By way of a non-limiting example, the voice input can be voice input 102 of a user received, or otherwise obtained, by emotionally-aware voice response generator 100 (e.g., via user interface 104). At step 604, a textual representation of the voice input is generated. By way of a non-limiting example, the voice input 102 received at step 602 can be used by speech-to-text converter 106 to generate, or otherwise obtain, a textual representation (e.g., voice input textual representation 302) of voice input 102. By way of a further non-limiting example, voice input textual representation 402 can be generated at step 604 using the voice input 102.

At step 606, a source emotion can be determined. By way of a non-limiting example, the source emotion can be determined, or otherwise obtained, using the textual representation of the voice input determined at step 604 using the voice input received at step 602. As discussed herein, the source emotion (e.g., source emotion 404) can be determined by emotion classifier 108 using a textual representation of the voice input 102 (e.g., voice input textual representation 402). By way of further non-limiting example, voice input textual representation 402 can be used by emotion classifier 108 to determine source emotion 404.

At step 608 of process 600, a response emotion can be determined. By way of a non-limiting example, response emotion 406 can be determined, or otherwise obtained, by response emotion identifier 110 using the source emotion (e.g., source emotion 404) determined at step 606 and a mapping such as that shown in rows 206, 208, 210 and 212 in example 200. With reference to source emotion 404, the mapping shown in row 212 can be used by response emotion identifier 110 to determine response emotion 406.

At step 610, a response can be generated. By way of a non-limiting example, as discussed in connection with FIG. 1, a response emotion can be determined by response emotion identifier 110 using the source emotion determined by emotion classifier 108. By way of a further non-limiting example, at step 610, response content generator 100 can use voice input textual representation (e.g., voice input textual representation 302, 402) alone or in combination with the response emotion (e.g., response emotion 406) determined at step 608 to determine a response textual representation (e.g., response textual representation 306, 408), which can be used to generate a response phonemic representation 310, 410 of the response. In accordance with one or more embodiments, the response phonemic representation 310, 410 can comprise a number of phonemes corresponding to the response textual representation 306, 408.

With reference to FIGS. 3 and 4, voice input textual representation 302, 402 can be generated by speech-to-text converter 106 using voice input 102. Voice input textual representation 302, 402 can be used by emotion classifier 108 to identify a source emotion (e.g., source emotion 404), which can be used by response emotion identifier 110 to determine a response emotion (e.g., response emotion 406) corresponding to the determined source emotion. Response textual representation 306, 408 can be generated by textual representation response generator 304 using voice input textual representation 302, 402 alone or in combination with the determined response emotion (e.g., response emotion 406). Response phonemic representation 310, 410 can be generated using response textual representation 306, 408.

Referring again to FIG. 6, at step 612, a frequency spectrum representation of the response can be generated. By way of a non-limiting example, frequency spectrum representation generator 114 can use input 502 (e.g., response phonemic representation 310, 410 alone or in combination with response emotion (e.g., response emotion 406) determined at step 608) to generate, or otherwise obtain, frequency spectrum representation 510.

With reference to FIG. 5, frequency spectrum representation generator 114 can comprise an audio embeddings generator 504, a text embeddings generator 506 and a frequency spectrum generator 508.

As discussed herein in connection with one or more disclosed embodiments, audio embeddings generated by audio embeddings generator 504 and text embeddings generated by text embeddings generator 506 can be used by frequency spectrum generator 508 to generate frequency spectrum representation 510 representing an audio of voice response 118. By way of a non-limiting example, the frequency spectrum representation 510 of voice response 118 can comprise a visual representation of a spectrum of frequencies of the audio of voice response 118. By way of a further non-limiting example, frequency spectrum representation 510 can comprise a visual representation of the signal strength of voice response 118 over time at a number of frequencies. By way of yet a further non-limiting example, frequency spectrum representation 510 can be a MEL spectrogram. In accordance with one or more embodiments, the frequency spectrum representation 510 of the audio of voice response 118 can be generated by the one or more neural networks of the frequency spectrum generator 508 using the sets of audio and text embeddings. The frequency spectrum representation 510 of the voice response 118 (e.g., a MEL spectrogram) can reflect, represent, or convey the content and emotion of the voice response 118 in an audio domain, or frequency domain.

Referring again to FIG. 6, at step 614, an emotionally-aware voice response can be generated. By way of a non-limiting example, an emotionally-aware voice response can be generated, at step 614, using the frequency spectrum representation (e.g., frequency spectrum representation 510) generated at step 612. By way of a further non-limiting example, audio representation generator 116 can use the frequency spectrum representation 510 (e.g., a MEL spectrogram) to generate voice response 118. By way of a non-limiting example, audio representation generator 116 can comprise a waveform generator to convert the frequency spectrum representation 510 (e.g., MEL spectrogram) to the voice response 118. The audio representation generator 116 can be configured to convert a digital representation of the voice response 118 to the voice response 118, which is an analog representation.

In accordance with one or more embodiments, the frequency spectrum representation 510 can be a digital representation of a spectrum of frequencies of voice response 118, and frequency spectrum representation 510 can be converted to the voice response 118 (an analog representation) using a waveform generator. As with the frequency spectrum representation 510, the voice response 118 can represent, reflect or convey both the textual content of the response (e.g., such as that shown in the response textual representation 408) and response emotion (e.g., such as that shown in response emotion 406). By way of a non-limiting example, the response emotion can be conveyed using a corresponding tone, voice, or the like. By way of a further non-limiting example, using a pacifying response emotion as an example, voice response 118 can comprise the textual content shown in response textual representation 408 spoken using a pacifying tone, or voice.

Referring again to FIG. 6, at step 616, the emotionally-aware voice response can be communicated. By way of a non-limiting example, the emotionally-aware voice response can be communicated to the user via the user interface 104. By way of a further non-limiting example, voice response 118 can be audio output as voice output 120 via user interface 104. By way of some non-limiting examples, the voice input 102 can be received and voice output 120 can be provided via a user device, such as and without limitation a smartphone, tablet, laptop, desktop, smart TV, virtual assistant, device, user computing device, a telephone (landline or cellular), or the like.

Figure 7:
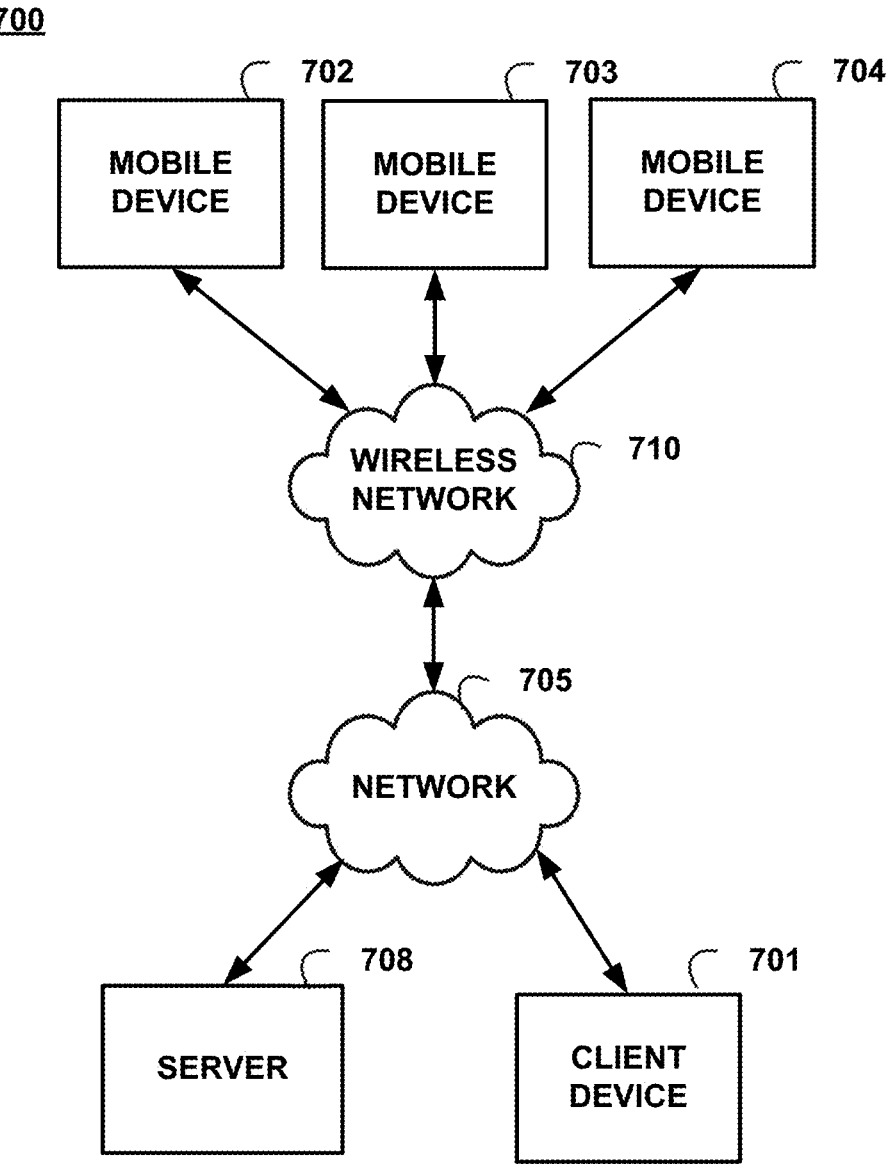
FIG. 7 is a schematic diagram illustrating an example of a network within which the systems and methods disclosed herein could be implemented according to some embodiments of the present disclosure.

FIG. 7 provides an example of components of a general environment in accordance with one or more embodiments. FIG. 7 shows components of a general environment in which the systems and methods discussed herein may be practiced. Not all the components may be required to practice the disclosure, and variations in the arrangement and type of the components may be made without departing from the spirit or scope of the disclosure. As shown, system 700 of FIG. 7 includes local area networks ("LANs")/wide area networks ("WANs")—network 705, wireless network 710, mobile devices (client devices) 702-704 and client device 701. FIG. 7 additionally includes a server 708. Examples of web servers include without limitation, application servers, content servers, search servers, advertising servers, etc.

In accordance with one or more embodiments, server 708 can include functionality disclosed herein in connection with one or more embodiments. Server 708 can host one or more web applications, for which user reaction is being monitored.

One embodiment of mobile devices 702-704 is described in more detail below. Generally, however, mobile devices 702-704 may include virtually any portable computing device capable of receiving and sending a message over a network, such as network 705, wireless network 710, or the like. Mobile devices 702-704 may also be described generally as client devices that are configured to be portable. Thus, mobile devices 702-704 may include virtually any portable computing device capable of connecting to another computing device and receiving information. Such devices include multi-touch and portable devices such as, cellular telephones, smart phones, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 702-704 also may include at least one client application that is configured to receive content from another computing device. The client application may include a capability to provide and receive textual content, graphical content, audio content, and the like. In one embodiment, mobile devices 702-704 may uniquely identify themselves through any of a variety of mechanisms, including a phone number, Mobile Identification Number (MIN), an electronic serial number (ESN), or other mobile device identifier.

In some embodiments, mobile devices 702-704 may also communicate with non-mobile client devices, such as client device 701, or the like. Client device 701 may include virtually any computing device capable of communicating over a network to send and receive information. Thus, client device 701 may also have differing capabilities for displaying navigable views of information.

Client device 701 and mobile devices 701-704 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 710 is configured to couple mobile devices 702-704 and its components with network 705. Wireless network 710 may include any of a variety of wireless sub-networks that may further overlay stand-alone ad-hoc networks, and the like, to provide an infrastructure-oriented connection for mobile devices 702-704. Such sub-networks may include mesh networks, Wireless LAN (WLAN) networks, cellular networks, and the like.

Network 705 is configured to communicatively couple web server 708 with other computing devices, including, client device 701, and through wireless network 710 to mobile devices 702-704. Network 705 is enabled to employ any form of computer readable media for communicating information from one electronic device to another. Also, network 705 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

A server, such as server 708, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers, such as web server 708 as well as other servers, such as and without limitation authentication servers, search servers, email servers, social networking services servers, SMS servers, IM servers, MMS servers, exchange servers, photo-sharing services servers, and travel services servers, via the network 705 using their various devices 701-704. In some embodiments, application server can host applications, such as an e-commerce application, a search engine, a content recommendation and/or distribution application, etc.

In some embodiments, web server 708 can store various types of applications and application related information including application data. As is discussed in more detail below, examples of application data include user behavior, application behavior, page visitation sequences, and visit intent and action data. In accordance with some embodiments, web server 708 can host an application, or applications, embodying functionality described herein.

Moreover, although FIG. 7 illustrates web server 708 as single computing devices, respectively, the disclosure is not so limited. For example, one or more functions of web server 708 may be distributed across one or more distinct computing devices. Moreover, in one embodiment, web server 708 may be integrated into a single computing device, without departing from the scope of the present disclosure.

Figure 8:
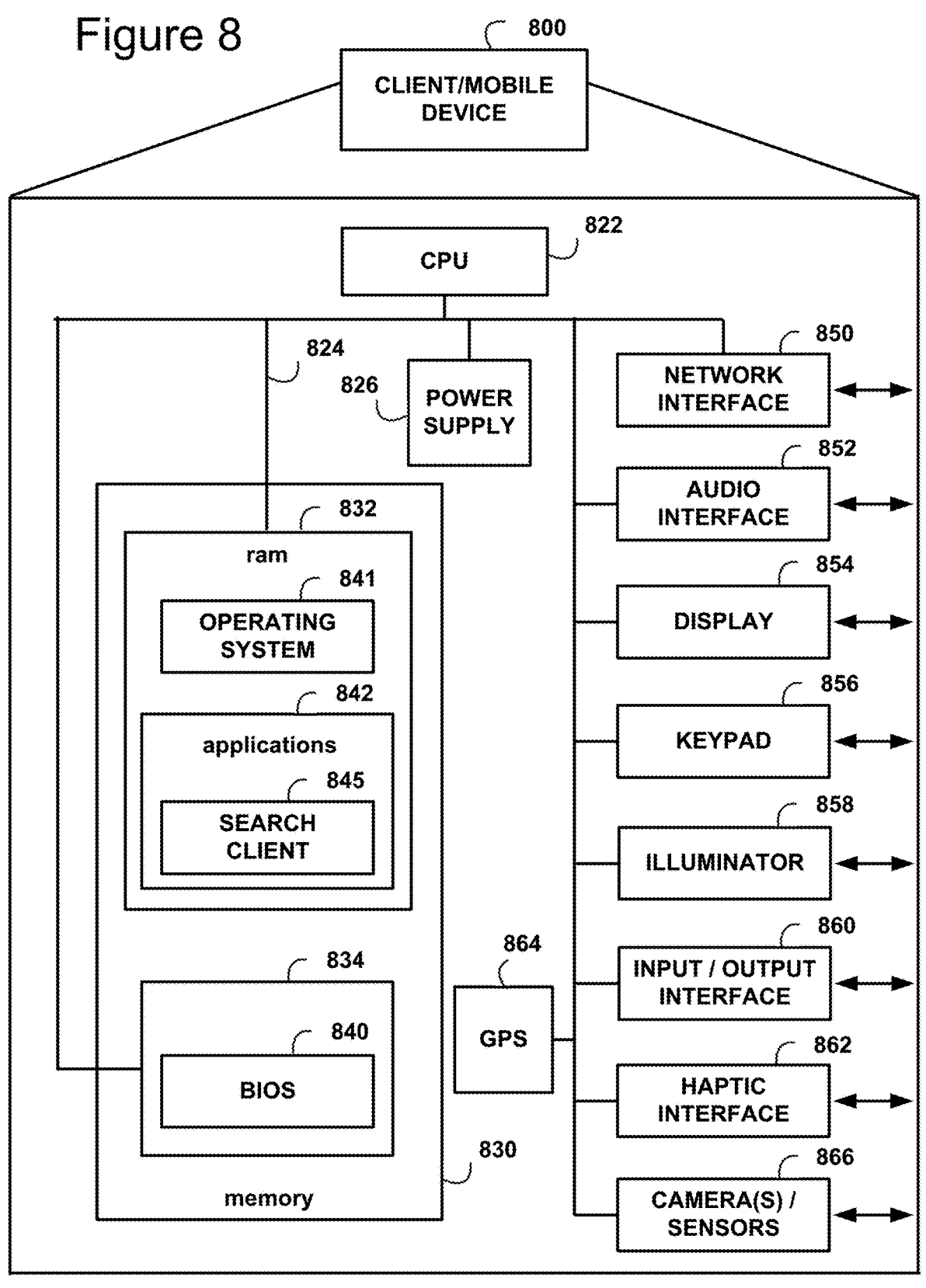
FIG. 8 depicts is a schematic diagram illustrating an example of client device in accordance with some embodiments of the present disclosure.

FIG. 8 is a schematic diagram illustrating an example embodiment of a computing device that may be used within the present disclosure. Device 800 may include many more or less components than those shown in FIG. 8. However, the components shown are sufficient to disclose an illustrative embodiment for implementing the present disclosure. Device 800 may represent, for example, client device 701 and mobile devices 701-704 discussed above in relation to FIG. 7.

As shown in the figure, device 800 includes a processing unit (CPU) 822 in communication with a mass memory 830 via a bus 824. Device 800 also includes a power supply 826, one or more network interfaces 850, an audio interface 852, a display 854, a keypad 856, an illuminator 858, an input/output interface 860, a haptic interface 862, an optional global positioning systems (GPS) transceiver 864 and a camera(s) or other optical, thermal or electromagnetic sensors 866. Device 800 can include one camera/sensor 866, or a plurality of cameras/sensors 866, as understood by those of skill in the art. The positioning of the camera(s)/sensor(s) 866 on device 800 can change per device 800 model, per device 800 capabilities, and the like, or some combination thereof.

Optional GPS transceiver 864 can determine the physical coordinates of device 800 on the surface of the Earth, which typically outputs a location as latitude and longitude values. GPS transceiver 864 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 830 includes a RAM 832, a ROM 834, and other storage means. Mass memory 830 illustrates another example of computer storage media for storage of information such as computer readable instructions, data structures, program modules or other data. Mass memory 830 stores a basic input/output system ("BIOS") 840 for controlling low-level operation of device 800. The mass memory also stores an operating system 841 for controlling the operation of device 800.

Memory 830 further includes one or more data stores, which can be utilized by device 800 to store, among other things, applications 842 and/or other data. For example, data stores may be employed to store information that describes various capabilities of device 800. The information may then be provided to another device based on any of a variety of events, including being sent as part of a header during a communication, sent upon request, or the like.

Applications 842 may include computer executable instructions which, when executed by device 800, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 842 may further include search client 845 that is configured to send, to receive, and/or to otherwise process a search query and/or search result using any known or to be known communication protocols. Although a single search client 845 is illustrated it should be clear that multiple search clients may be employed.

Figure 9:
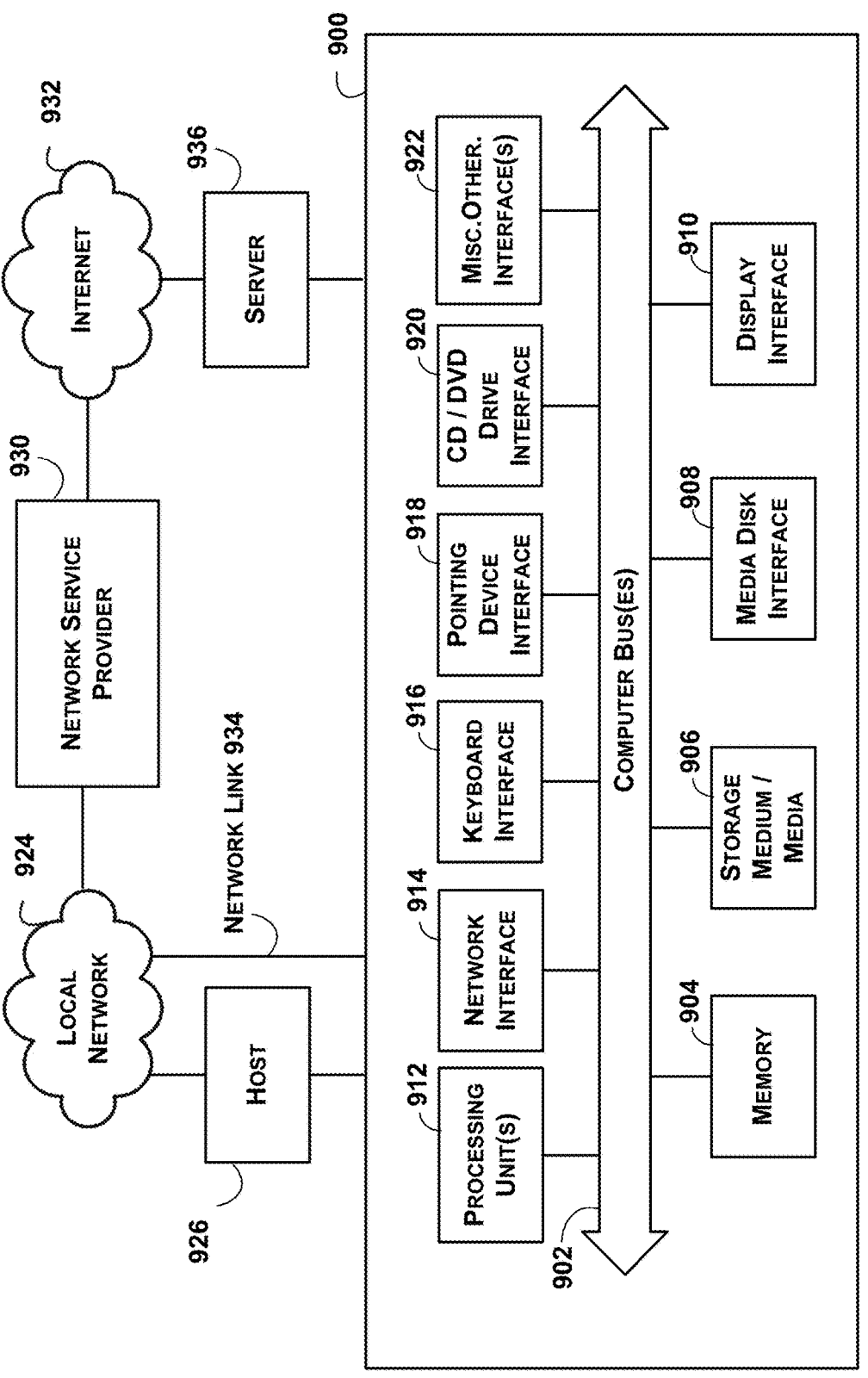
FIG. 9 is a block diagram illustrating the architecture of an exemplary hardware device in accordance with one or more embodiments of the present disclosure.

As shown in FIG. 9, system 900 internal architecture of a computing device(s), computing system, computing platform, user devices, set-top box, smart TV and the like includes one or more processing units, processors, or processing cores, (also referred to herein as CPUs) 912, which interface with at least one computer bus 902. Also interfacing with computer bus 902 are computer-readable medium, or media, 906, media disk interface 908, network interface 914, memory 904, e.g., random access memory (RAM), run-time transient memory, read only memory (ROM), media disk drive interface 920 as an interface for a drive that can read and/or write to media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 934 typically provides information communication using transmission media through one or more networks to other devices that use or process the information. For example, network link 934 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server 936 connected to the Internet 932 hosts a process that provides a service in response to information received over the Internet 932. For example, server 936 can host a process that provides information representing video data for presentation at a display via display interface 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as a storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 912 as it is received, or may be stored in memory 904 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:

obtaining, by a computing device, voice input from a user via an automated voice response user interface of an application;

obtaining, by the computing device, a textual representation of the voice input;

using, by the computing device, the textual representation of the voice input to obtain a source emotion of the user;

determining, by the computing device, a response emotion using the source emotion;

generating, by the computing device, a response textual representation using the textual representation of the voice input, the response textual representation indicating textual content of the response;

generating, by the computing device, a frequency spectrum representation of the response in accordance with the response textual representation and the response emotion, the frequency spectrum representation comprising a spectrogram that represents the response textual representation and the response emotion, the generation comprising:

determining, by the computing device, a set of audio embeddings using a first neural network trained to generate the set of audio embeddings using a phonemic representation of the response textual representation and the response emotion;

determining, by the computing device, a set of text embeddings using a second neural network trained to generate the set of text embeddings using the phonemic representation of the response textual representation; and using, by the computing device, the set of audio embeddings and the set of text embeddings and a third neural network trained to generate the frequency spectrum representation in accordance with the response textual representation and the response emotion;

using, by the computing device, the frequency spectrum representation of the response to generate a voice response reflective of the textual content of the response and the response emotion, the generation of the voice response comprising converting the spectrogram to a waveform representation;

communicating, by the computing device, the voice response to the user via the automated voice response user interface of the application, the communication comprising a visualization of the voice response based on the frequency spectrum representation, such that a signal strength of the voice response is visually provided respective to a time period at a number of frequencies;

obtaining, by the computing device, subsequent voice input from the user via the automated voice response user interface of the application;

determining, by the computing device, a source emotion for the subsequent voice input;

determining, by the computing device, an effectiveness of the voice response based on the determined source emotion for the subsequent voice input, the effectiveness determination comprising a determination of whether the determined source emotion for the subsequent voice input corresponds to an emotion within a set of predetermined emotions designated as undesirable or to an emotion within a set of predetermined emotions designated as desirable; and tuning or training, by the computing device, based on the determined effectiveness of the voice response, at least one of a response emotion identifier or a response content generator.

2. The method of claim 1, wherein the first neural network comprises a Long Short-Term Memory (LSTM) neural network, the second neural network comprises an attention-based neural network and the third neural network comprises an LSTM neural network.

3. The method of claim 1, wherein generating a response textual representation further comprises:

using, by the computing device, the response emotion and the textual representation of the voice input to generate the response textual representation indicating textual content of the response.

4. The method of claim 1, wherein obtaining a source emotion of the user further comprises:

using, by the computing device, a trained emotion classifier and the textual representation of the voice input to determine the source emotion of the user.

5. The method of claim 1, wherein obtaining a response emotion further comprises:

determining, by the computing device, the response emotion using a mapping from the source emotion to the response emotion.

6. The method of claim 1, wherein generating a response textual representation further comprises:

using, by the computing device, a model trained using a number of samples and a machine learning algorithm to generate the response textual representation, each sample of the number of samples comprising a first communication and a second communication, the second communication acting as a label for the sample indicating a response to the first communication.

7. The method of claim 1, further comprising:

obtaining, by the computing device, a phonemic representation of the response using the determined response textual representation.

8. The method of claim 7, wherein the phonemic representation of the response is used to generate the frequency spectrum representation of the response.

9. The method of claim 1, wherein a waveform generator and the frequency spectrum representation of the response are used to generate the voice response reflective of the textual content of the response and the response emotion.

10. The method of claim 1, wherein the generation of the frequency spectrum representation comprises stacking the first neural network, the second neural network and the third neural network.

11. The method of claim 1, wherein the first neural network, the second neural network and third neural network are selected from a group consisting of: a Long Short-Term Memory (LSTM) neural network, an attention-based neural network (ANN), a recurrent neural network (RNN), wherein the RNN comprises one or more LSTM inner layers and an embedding layer for audio embedding generation.

12. A non-transitory computer-readable storage medium tangibly encoded with computer-executable instructions that when executed by a processor associated with a computing device perform a method comprising:

obtaining voice input from a user via an automated voice response user interface of an application;

obtaining a textual representation of the voice input;

using the textual representation of the voice input to obtain a source emotion of the user;

determining a response emotion using the source emotion;

generating a response textual representation using the textual representation of the voice input, the response textual representation indicating textual content of the response;

generating a frequency spectrum representation of the response in accordance with the response textual representation and the response emotion, the frequency spectrum representation comprising a spectrogram that represents the response textual representation and the response emotion, the generation comprising:

determining a set of audio embeddings using a first neural network trained to generate the set of audio embeddings using a phonemic representation of the response textual representation and the response emotion;

determining a set of text embeddings using a second neural network trained to generate the set of text embeddings using the phonemic representation of the response textual representation; and using the set of audio embeddings and the set of text embeddings and a third neural network trained to generate the frequency spectrum representation in accordance with the response textual representation and the response emotion;

using the frequency spectrum representation of the response to generate a voice response reflective of the textual content of the response and the response emotion, the generation of the voice response comprising converting the spectrogram to a waveform representation;

communicating the voice response to the user via the automated voice response user interface of the application, the communication comprising a visualization of the voice response based on the frequency spectrum representation, such that a signal strength of the voice response is visually provided respective to a time period at a number of frequencies;

obtaining, by the computing device, subsequent voice input from the user via the automated voice response user interface of the application;

determining, by the computing device, a source emotion for the subsequent voice input;

determining, by the computing device, an effectiveness of the voice response based on the determined source emotion for the subsequent voice input, the effectiveness determination comprising a determination of whether the determined source emotion for the subsequent voice input corresponds to an emotion within a set of predetermined emotions designated as undesirable or to an emotion within a set of predetermined emotions designated as desirable; and tuning or training, by the computing device, based on the determined effectiveness of the voice response, at least one of a response emotion identifier or a response content generator.

13. The non-transitory computer-readable storage medium of claim 12, the method further comprising:

obtaining a phonemic representation of the response using the determined response textual representation.

14. The non-transitory computer-readable storage medium of claim 13, the phonemic representation of the response being used to generate the frequency spectrum representation of the response.

15. The non-transitory computer-readable storage medium of claim 12, the method further comprising using a waveform generator and the frequency spectrum representation of the response to generate the voice response reflective of the textual content of the response and the response emotion.

16. The non-transitory computer-readable storage medium of claim 12, wherein the generation of the frequency spectrum representation comprises stacking the first neural network, the second neural network and the third neural network.

17. A computing device comprising:

a processor, configured to:

obtain voice input from a user via an automated voice response user interface of an application;

obtain a textual representation of the voice input;

use the textual representation of the voice input to obtain a source emotion of the user;

determine a response emotion using the source emotion;

generate a response textual representation using the textual representation of the voice input, the response textual representation indicating textual content of the response;

generate a frequency spectrum representation of the response in accordance with the response textual representation and the response emotion, the frequency spectrum representation comprising a spectrogram that represents the response textual representation and the response emotion, the generation comprising:

determining a set of audio embeddings using a first neural network trained to generate the set of audio embeddings using a phonemic representation of the response textual representation and the response emotion;

determining a set of text embeddings using a second neural network trained to generate the set of text embeddings using the phonemic representation of the response textual representation; and using the set of audio embeddings and the set of text embeddings and a third neural network trained to generate the frequency spectrum representation in accordance with the response textual representation and the response emotion;

use the frequency spectrum representation of the response to generate a voice response reflective of the textual content of the response and the response emotion, the generation of the voice response comprising converting the spectrogram to a waveform representation;

communicate the voice response to the user via the automated voice response user interface of the application, the communication causing visualization of the voice response based on the frequency spectrum representation, such that a signal strength of the voice response is visually provided respective to a time period at a number of frequencies;

obtain subsequent voice input from the user via the automated voice response user interface of the application;

determine a source emotion for the subsequent voice input;

determine an effectiveness of the voice response based on the determined source emotion for the subsequent voice input, the effectiveness determination comprising a determination of whether the determined source emotion for the subsequent voice input corresponds to an emotion within a set of predetermined emotions designated as undesirable or to an emotion within a set of predetermined emotions designated as desirable; and tune or train, based on the determined effectiveness of the voice response, at least one of a response emotion identifier or a response content generator.

18. The computing device of claim 17, the processor further configured to:

obtain a phonemic representation of the response using the determined response textual representation, the phonemic representation of the response being used to generate the frequency spectrum representation of the response.

19. The computing device of claim 17, the processor further configured to use a waveform generator and the frequency spectrum representation of the response to generate the voice response reflective of the textual content of the response and the response emotion.

* * * * *